United States Patent [19]
Vanderveen

[11] 3,989,804
[45] Nov. 2, 1976

[54] CARBON BLACK METHOD
[75] Inventor: John W. Vanderveen, Bartlesville, Okla.
[73] Assignee: Phillips Petroleum Company, Bartlesville, Okla.
[22] Filed: Nov. 18, 1974
[21] Appl. No.: 524,832

Related U.S. Application Data
[63] Continuation of Ser. No. 286,893, Sept. 7, 1972, abandoned.

[52] U.S. Cl. .............................. 423/457; 23/259.5; 423/450; 423/456
[51] Int. Cl.² .......................................... C09C 1/50
[58] Field of Search .......... 423/456, 457, 450, 455; 23/259.5

[56] References Cited
UNITED STATES PATENTS

| | | | |
|---|---|---|---|
| 3,026,185 | 3/1962 | Takewell et al. | 23/259.5 |
| 3,410,660 | 11/1968 | Henderson et al. | 423/456 |
| 3,431,075 | 3/1969 | Gunnell | 423/457 X |
| 3,592,597 | 7/1971 | Krejci | 423/456 |
| 3,607,057 | 9/1971 | Henderson et al. | 423/456 |
| 3,877,876 | 4/1975 | Cheng | 423/456 X |

Primary Examiner—Edward J. Meros

[57] ABSTRACT

A method and apparatus for producing carbon black in which a first reactant mass is formed and thoroughly mixed and passed axially through the reactor, a second mass of hot combustion gases being passed helically to the axially flowing mass.

3 Claims, 2 Drawing Figures

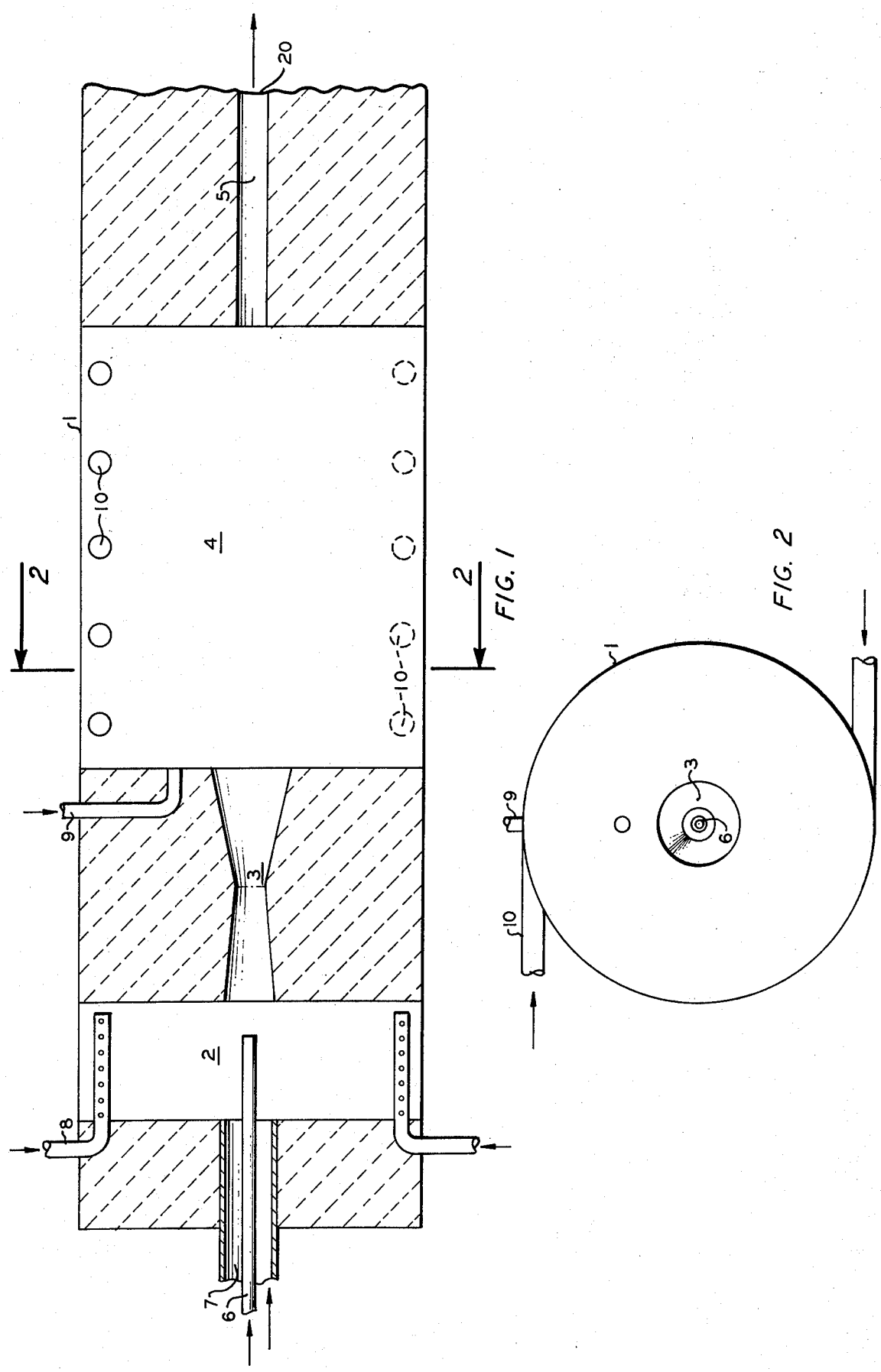

CARBON BLACK METHOD

This is a division application of copending application Ser. No. 286,893, filed Sept. 7, 1972, now abandoned.

This invention relates to a method and reactor for the production of carbon black.

In one of its more specific aspects, this invention relates to a method and apparatus for the production of carbon black which employs an improved method of mixing the reactants.

In many carbon black reactors, control over the early stages of contact between the hydrocarbon feed and hot combustion gases, contacted with the feed to decompose it, is poor. The method and apparatus of the present invention attempts to solve this problem by establishing in the reactor a nonrotating axially-directed flow of reactants on the center line of a symmetrical reactor and thereafter establishing about that core a mass of gases which passes through the reactor as a helical or swirling mass.

According to the present invention a hydrocarbon feed and a fuel, preferably natural gas, are introduced axially into the symmetrical reactor along the longitudinal axis thereof into a first mixing zone. An oxidant, preferably air, is introduced radially into the first mixing zone in nonswirling flow to form a first reactant mass.

The first reactant mass is then passed through a mixing zone, preferably comprising a sharply diverging nozzle, or venturi, to establish those reactants introduced into the first zone as a well mixed, nonrotating core of reactants flowing longitudinally within the reactor. This nonrotating core of reactants is passed into a second zone into which tangential introduction of air and axial introduction of fuel is made to establish the hot combustion gases so introduced as a helically flowing mass in respect to the nonrotating core of reactants. The total mass is then passed into the reaction section of the reactor where the pyrolytic decomposition of the feed takes place and from which carbon black is recovered.

The effect of the method and apparatus is such as minimize product property variation within the same reactor as caused by large variations in reaction rates.

While the quantity of hot combustion gases introduced to form the first reactant mass and the quantity introduced to form the total mass can vary widely, it is preferable that the first quantity be within the range of from about 40 percent to about 60 percent of the total quantity of hot combustion gases employed. Preferably, both quantities of hot combustion gases will be at about the same temperature.

The apparatus of this invention is illustrated in the attached drawing in which

FIG. 1 illustrates an embodiment of the invention in elevation and

FIG. 2 illustrates a cross section through section 2—2 of FIG. 1.

In general, the method of this invention is carried out employing such reactants, quantity of reactants, and operating conditions as temperatures under conventional methods of producing carbon black as set forth in U.S. Pat. No. 2,564,700 to Krejci. The tangential introduction of reactants into the second mixing zone is also made as set out therein.

By the method of this invention, the structure of the carbon black can be adjusted without substantially altering the surface area of the black. For purposes of simplification, the present invention will be described in terms of introducing hot combustion gas into the reactor, this expression meaning either or both of the above procedures.

Referring now to FIG. 1 there is shown reactor 1 comprising first zone 2, venturi 3, second zone 4 and reaction zone 5 from which carbon black is recovered through port 20, discharging from the reactor.

Hydrocarbon feed and fuel gas are introduced axially into the first zone 2 through conduits 6 and 7 in any conventional manner. Conduit 6 can be adapted to discharge at any point within zone 2 or within venturi 3.

Also introduced radially into zone 2 through conduits 8 is combustion supporting gas, such as air. Any plurality of conduits 8 can be supplied, the conduits preferably containing a plurality of apertures in their walls such that the reactants introduced therethrough comprise small diameter streams which disperse rapidly with the axially introduced reactants to form a reactant mass of substantially uniform composition, the reactants being introduced at a multiplicity of points along the length of the zone.

The reactant mass produced in the first zone is then passed through a sharply diverging nozzle, illustrated as venturi 3 and into second zone 4.

The diverging nozzle, hereinafter referred to as a venturi, can be of any length and of any configuration. Preferably, its upstream section will converge at a total angle of from about 5° to about 10° and its downstream section will diverge at a total angle of from about 10° to about 25°, the venturi being of such a length as to maximize mixing without creating excessive pressure drop.

The downstream section of the venturi opens into second zone 4. While some introduction of fuel or hot combustion gases can be made into the second zone through conduits 9, which discharge substantially parallel to the general direction of flow through the reactor, the major introduction of combustion supporting gases will preferably be made through a plurality of conduits 10 adapted for tangential introduction into the zone and positioned along the length of the zone as convenient.

The second reactant mixture formed in the second zone is then passed into carbon black formation zone 5 which, while shown as a zone of smaller diameter than the second zone, can be of any diameter.

The method and apparatus of the present invention are illustrated by the following.

A reactor having fist and second zones 6 inches in diameter was employed.

Hydrocarbon feed and fuel were introduced axially into the first zone and air was introduced radially thereinto, the zone having a length of about 2 inches.

The fuel was burned with the air in the first zone to produce a reactant mass at about carbon black formation temperatures. This nonrotating reactatnt mass was passed via a venturi with ½ inch diameter throat into the second zone which was about 12 inches long and into which introduction of air was made tangentially through 10 ports opening into the zone as five equally-spaced openings on two opposite sides of the reactor. Axial introduction of fuel was made into the second section upstream of the ports.

The second reactant mass was then passed into a carbon black formation zone which has a ½ inch diameter and from which carbon black was recovered.

Operating conditions in two runs were as follows:

|  | Runs | |
|---|---|---|
|  | 1 | 2 |
| Zone 2 of Drawing | | |
| Hydrocarbon Feed, cc/min | 5.0 | 5.0 |
| Axial Fuel, SCF/min | 0.32 | 0.36 |
| Radial Air, SCF/min | 3.3 | 5.35 |
| Zone 4 of Drawing | | |
| Axial Fuel, SCF/min | 0.36 | 0.36 |
| Tangential Air, SCF/min | 4.25 | 4.25 |
| Carbon Black Product | | |
| Iodine Absorption, m$^2$/gm | 138 | 142 |
| Photelometer | 83 | 91 |
| Dibutylphthalate, cc/100 g | 140 | 125 |

These data indicate that while considerable lower air rates were employed in zone 2, the surface areas of the blacks were comparative (Iodine Absorption) but the structure of the blacks differed considerably.

With reference again to the drawing, in a plant size operation the venturi throat will be from about ½ inch to 5 inches in diameter; zone 2 will be from about 24 inches to 42 inches in diameter and its length will be from about ¼ to about ½ this diameter, usually being not greater than 12 inches. The reactor zone 5 will usually be about 4 inches to about 15 inches in diameter; and zone 4 will be about the same diameter as zone 2, the length of zone 4 usually being from about 12 inches to about 24 inches.

It will be evident from the foregoing that various modifications can be made to the method of this invention. Such are considered, however, to be within the scope thereof.

What is claimed is:

1. A process for producing carbon black comprising:
   a. introducing reactant materials comprising hydrocarbon feed and fuel gas axially into a first section of a carbon black reactor with an oxidant introduced in radial flow to produce a first reactant mass;
   b. passing said reactants through a mixing zone producing a nonrotating first reactant mass flowing longitudinally in the reactor;
   c. passing the non-rotating reactant mass into a second section of the carbon black reactor with addition of a tangential flow of air and an axial flow of fuel gas to produce a total reaction mass comprising a non-rotating reactant mass flowing longitudinally in the reactor surrounded by a helically flowing mass of hot combustion gases;
   d. passing the total reactant mass into a pyrolytic reaction section to produce carbon black; and
   e. recovering the carbon black produced.

2. The process of claim 1 wherein from about 40 percent to about 60 percent by volume of the total combustion gases is supplied to the first section of the carbon black reactor.

3. The process of claim 1 wherein the first reactant mass is passed through a mixing zone comprising a venturi producing a non-rotating reactant mass thereby.

* * * * *